United States Patent
Deberling et al.

(10) Patent No.: US 10,604,133 B2
(45) Date of Patent: Mar. 31, 2020

(54) BRAKE BOOSTER AND BRAKE DEVICE INCLUDING A BRAKE BOOSTER OF THIS TYPE

(71) Applicant: Robert Bosch GmbH, Stuttgart (DE)

(72) Inventors: Andreas Deberling, Erdmannhausen (DE); Andreas Ohm, Kupferzell (DE); Daniel Weissinger, Korntal-Muenchingen (DE); Markus Baur, Gestratz (DE); Willi Nagel, Remseck/Hochdorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/759,266

(22) PCT Filed: Jul. 13, 2016

(86) PCT No.: PCT/EP2016/066623
§ 371 (c)(1),
(2) Date: Mar. 12, 2018

(87) PCT Pub. No.: WO2017/045796
PCT Pub. Date: Mar. 23, 2017

(65) Prior Publication Data
US 2018/0251114 A1 Sep. 6, 2018

(30) Foreign Application Priority Data
Sep. 14, 2015 (DE) .......... 10 2015 217 548

(51) Int. Cl.
*B60T 13/74* (2006.01)
*F16H 25/20* (2006.01)
*B60T 11/18* (2006.01)

(52) U.S. Cl.
CPC ............ *B60T 13/745* (2013.01); *B60T 11/18* (2013.01); *F16H 25/20* (2013.01);
(Continued)

(58) Field of Classification Search
CPC ...................................................... B60T 7/042
See application file for complete search history.

(56) References Cited

U.S. PATENT DOCUMENTS 4,395,883 A * 8/1983 Melinat ................ B60T 13/745
60/545

FOREIGN PATENT DOCUMENTS

CN 102325680 A 1/2012
DE 102006017734 A1 10/2007
(Continued)

OTHER PUBLICATIONS

International Search Report dated Sep. 28, 2016, of the corresponding International Application PCT/EP2016/066623 filed Jul. 13, 2016.

*Primary Examiner* — F Daniel Lopez
*Assistant Examiner* — Michael Quandt
(74) *Attorney, Agent, or Firm* — Norton Rose Fulbright US LLP; Gerard Messina

(57) ABSTRACT

A brake booster for a brake master cylinder of a motor vehicle, including a drive motor, which is connected/is connectable via a transmission to a pressure piston for the brake master cylinder, the transmission including a rotatable spindle nut having an inner thread, and a rotatably fixed axially displaceable spindle rod having an outer thread, the threads engaging with one another in order to convert a rotational movement of the drive motor into a translational movement of the spindle rod, and the spindle nut including an outer toothing, which is engaged with a toothing of a drive wheel of the transmission. It is provided that the spindle nut is displaceable axially relative to the drive wheel.

11 Claims, 4 Drawing Sheets

(52) U.S. Cl.
CPC ........ *F16H 25/2018* (2013.01); *B60T 13/746* (2013.01); *F16H 2025/2046* (2013.01); *F16H 2025/2081* (2013.01)

(56) References Cited

FOREIGN PATENT DOCUMENTS

| | | |
|---|---|---|
| DE | 102012014361 A1 | 1/2014 |
| DE | 102013006795 A1 | 10/2014 |
| EP | 277097 A1 | 8/1988 |
| EP | 2137035 A1 | 12/2009 |
| JP | 2008064194 A | 3/2008 |
| JP | 2013071536 A | 4/2013 |

* cited by examiner

BRAKE BOOSTER AND BRAKE DEVICE INCLUDING A BRAKE BOOSTER OF THIS TYPE

FIELD

The present invention relates to a brake booster for a brake master cylinder of a motor vehicle, including a drive motor, which is connected or connectable to a pressure piston for the brake master cylinder via a transmission, the transmission including a rotatable spindle nut having an inner thread and a rotatably fixed spindle rod having an outer thread, the threads being engaged with one another in order to convert a rotational movement of the drive motor into a translational movement of the pressure piston, and the spindle nut including an outer toothing, which is engaged with a toothing of a drive wheel of the transmission. The present invention further relates to a brake device for a motor vehicle, including a brake pedal actuatable by a driver, which is mechanically coupled to a pressure piston for the brake master cylinder.

BACKGROUND INFORMATION

German Patent Application No. DE 10 2012 014 361 A1, for example, describes a brake booster for a brake master cylinder of a motor vehicle, which includes a drive motor and a transmission that connects the drive motor to a pressure piston of the brake master cylinder. The transmission in this case includes a section, which is designed as a spindle gear in order to convert a rotational movement of the drive motor into a translational movement of the spindle rod for actuating the pressure piston. The spindle gear also includes a spindle nut having an inner thread and a spindle rod having an outer thread, the two threads engaging with one another in order to convert the rotational movement into a translational movement. Spindle gears may be provided with trapezoidal threads, so that both the inner thread as well as the outer thread are designed as trapezoidal threads and engage in one another accordingly. To drive the spindle nut, the spindle nut may be provided with an outer toothing, which meshes with the toothing of a drive wheel of the transmission, in order to transfer the torque supplied by the drive motor to the spindle nut. In this case the drive wheel may be situated, for example, next to the spindle nut in such a way that the rotation axes of spindle nut and drive wheel are oriented in parallel to one another.

SUMMARY

An example brake booster according to the present invention may have the advantage over conventional embodiments that an emergency operating mode is ensured, which allows an actuation of the brake master cylinder by the driver regardless of an activation of the drive motor. The driver may, in particular, actuate the brake pedal and translationally displace the pressure piston for actuating the brake master cylinder, without damaging the transmission or the brake booster in the process. The present invention therefore allows an advantageous integration of the brake booster in an existing braking system and into a non-destructive emergency operating mode. The example brake booster according to the present invention is distinguished by the fact that the spindle nut is displaceable axially relative to the drive wheel. Due to the axial displacement, the spindle nut may be axially moved or translationally displaced together with the spindle rod. If the user, by actuating the brake pedal, applies a sufficiently high force, he/she may then ensure that the spindle rod moves and, as a result, the spindle nut is also moved and displaced axially relative to the drive wheel. Thus, due to the axial displacement of the spindle nut, it is ensured that the spindle thread is not damaged when the user exerts a correspondingly high braking force on the brake pedal in order to move the pressure piston.

In accordance with the present invention, it is particularly preferably provided that the outer toothing of the spindle nut extends further over a sleeve-like section of the spindle nut than the toothing of the drive wheel, so that the outer toothing and toothing engage for rotational entrainment regardless of an axial displacement of the spindle nut. Thus, the spindle nut and the drive wheel are also still intermeshed when the spindle nut has been shifted axially relative to an initial position. As a result, it is still possible, even when the spindle nut has been shifted, that by activating the drive motor, which is designed, in particular, as an electric motor, the driver is assisted by a torque generated by the electric motor, which acts from the drive wheel on the spindle nut. In this way, the driver may be assisted at any time during operation by the brake booster. This makes it possible, for example, for the drive motor, when a user actuates the brake pedal faster than the drive motor is able to respond, to generate an additional baking torque within a very short period of time, although not immediately at the start of the actuation, but during the further course of actuation, namely for example, also when the spindle rod has already been shifted axially a distance.

According to one preferred refinement of the present invention, it is provided that the outer toothing is designed as axial toothing. This then ensures that no torque is applied to the drive motor via the transmission when the spindle nut is axially shifted. This ensures, in particular, that the spindle nut is axially displaceable at any time because, for example, the frictional torque of the transmission and of the drive motor are not able to inhibit the shift of the spindle nut. In addition, the axial toothing is also cost-efficiently manufacturable. The gear wheel transmission formed by the outer toothing and the toothing is advantageously designed in such a way that the teeth of the respective toothing are shaped and dimensioned as a function of their material. Thus, it is provided, in particular, that teeth manufactured from a less solid material have a larger tooth width than teeth that are manufactured from a more solid material. The geometry of the toothing or of the transmission in this case is advantageously selected in such a way that a sufficient overlapping of the teeth and thus a reliable torque transmission is ensured under all environmental conditions.

It is further advantageously provided that the drive wheel is designed as a drive internal gear and the toothing is designed as inner toothing of the drive internal gear. As a result, the drive internal gear is situated coaxially relative to the spindle nut and the spindle nut is guided through the drive internal gear. This results in an advantageously compact specific embodiment of the brake booster. In addition, the torque supplied by the drive internal gear is transferred evenly into the spindle nut. An advantageous contouring of the teeth of the outer toothing also preferably ensures that the drive internal gear and the spindle nut are automatically centered relative to one another. For this purpose, the tooth flanks of the teeth are each oriented diagonally in relation to a radial extension, so that the teeth exhibit a conical cross section.

According to one preferred refinement, it is also provided that the spindle nut includes an axial stop for the drive internal gear. As a result, the spindle nut is maximally displaceable axially to a point until the axial stop strikes the drive internal gear. In this way, the displacement of the spindle nut is limited in at least one axial direction. The result that may be achieved by this, in particular, is that in the event of an axial shift, the outer toothing is reliably prevented from separating or disengaging from the toothing. A preferred initial position of the spindle nut in relation to the drive internal gear is also defined by the axial stop.

It is further preferably provided that the axial stop is designed at least in sections perpendicular to the axial extension of the spindle nut. Thus, the axial stop forms a stop oriented perpendicular to the movement path of the spindle nut, which flatly or perpendicularly strikes the drive internal gear. Particularly strong axial forces may be transferred as a result.

According to one alternative specific embodiment of the present invention, it is preferably provided that the axial stop is oriented at least in sections at an angle to the axial extension of the spindle sleeve. As a result of the angled section of the axial stop, radial forces, in addition to an axial force, are also transferred by the spindle nut to the drive internal gear, as a result of which, in particular, an advantageous centering of the spindle nut relative to the drive internal gear is achieved when the axial stop is pressed against the drive internal gear.

The axial stop is particularly preferably conically designed, so that it exhibits a stop surface that extends over the entire circumference and is oriented at an angle relative to the axial extension of the spindle sleeve. The conical design ensures a particularly advantageous automatic centering of the spindle nut relative to the drive internal gear.

The drive internal gear advantageously includes a stop formed complementarily to the axial stop. This ensures an advantageous fit and an advantageous interaction between the spindle nut and the drive internal gear. The complementary design of the stop of the drive internal gear results in an advantageous centering, in particular, if the axial stop is conically designed in sections or entirely.

According to one preferred refinement of the present invention, it is provided that the outer toothing of the spindle nut extends into the axial stop. Thus, the axial stop includes a section of the toothing or outer toothing, through which the displacement path of the spindle nut is maximized and, in particular, through which high torques may be transferred, in particular, in the area of the axial stop.

According to one preferred refinement of the present invention, it is provided that the spindle nut is assigned at least one spring element, which presses the spindle nut with the axial stop against the drive internal gear. The spring element ensures that the spindle nut is moved automatically into the previously mentioned initial position. The spring element counteracts, in particular, the braking force, so that after a braking operation is carried out, the transmission is automatically returned to its initial position by the spring element. This easily ensures that even when the spindle nut has been shifted axially relative to the drive internal gear, the initial state is automatically re-established.

An example brake device according to the present invention includes the brake booster according to the present invention. This results in the previously cited advantages. Additional advantages and preferred features result, in particular, from the description above.

The pressure piston particularly preferably forms the spindle rod or is mechanically acted upon by the spindle rod in direct extension of the spindle rod. Thus, the pressure piston, in particular, of the brake master cylinder, is an integral component of the brake booster, as a result of which a particularly compact specific embodiment of the brake device is provided.

The present invention and its advantages are described in greater detail below with reference to exemplary embodiments.

DETAILED DESCRIPTION OF EXAMPLE EMBODIMENTS

Figure 1:
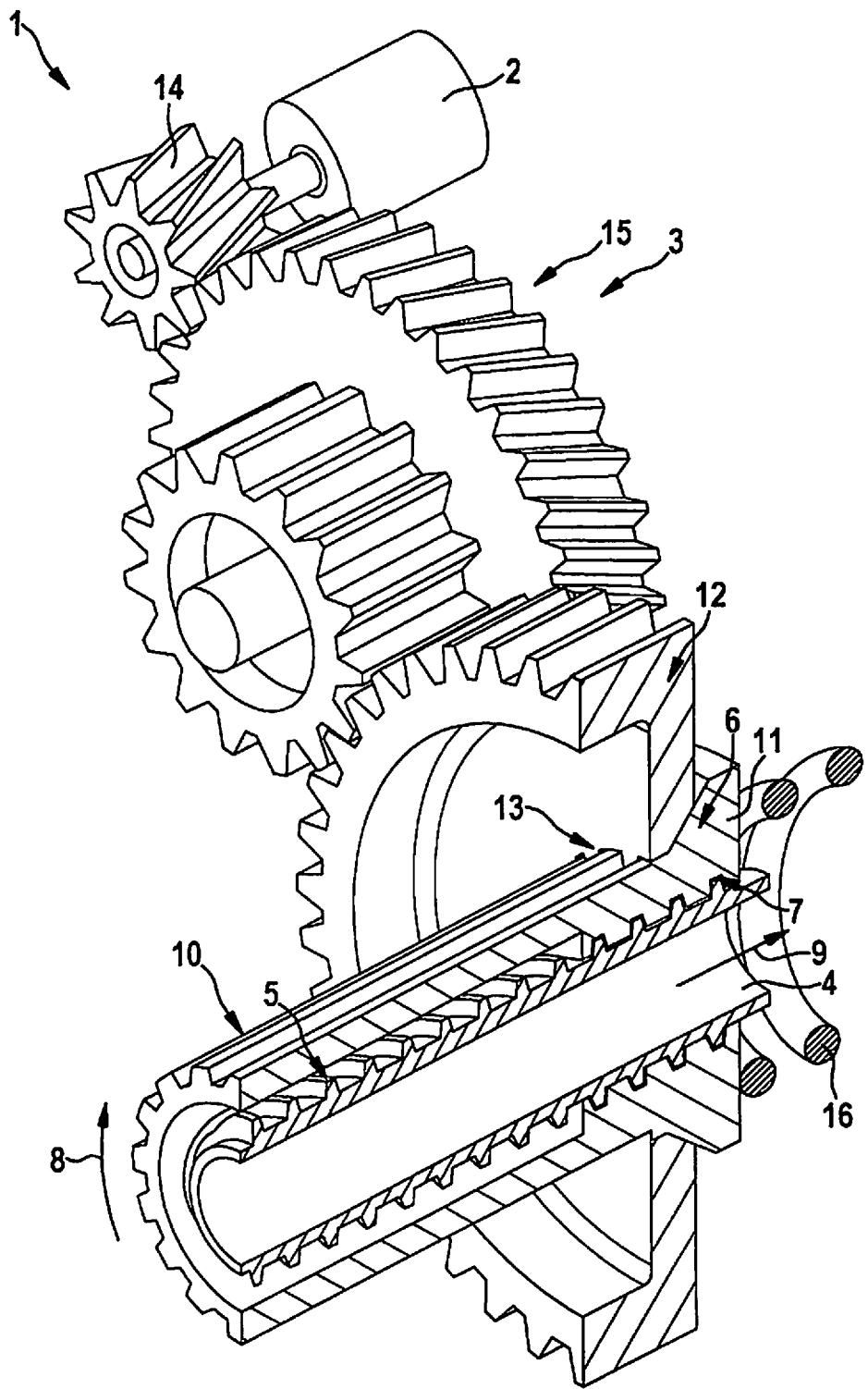
FIG. 1 shows a brake booster in a perspective sectional representation.

FIG. 1 shows a simplified representation of a brake booster for a brake master cylinder of a motor vehicle not further depicted herein.

Brake booster 1 includes a drive motor 2 depicted here in simplified form, which is designed as an electric motor and is operatively connected to a transmission 3 having a pressure piston. The pressure piston in this case is depicted herein merely in sections and in a longitudinal section. The pressure piston is designed as a hollow rod, which includes an outer thread 5. The pressure piston is mechanically connected axially at one end to the brake master cylinder and at the other end to a brake pedal of the motor vehicle that includes brake master cylinder 1. The pressure piston in this case is designed to be axially displaceable in order when actuating the brake pedal to apply a force to the brake master cylinder to actuate it.

Pressure piston 4 with outer thread 5 forms a spindle rod, on which a spindle nut 6 is rotatably mounted. Spindle nut 6 includes an inner thread 7 in sections, which engages with outer thread 5. Outer thread 5 and inner thread 7 in this case are each designed as trapezoidal threads. Outer thread 5 in this arrangement, as viewed axially, extends over a section that is more than double the size of inner thread 7. If spindle nut 6 is set into rotational motion, as indicated by an arrow 8, this causes an axial displacement of pressure piston 4 resulting from the meshing trapezoidal threads, as shown by an arrow 9.

Spindle nut 6 also includes an outer toothing 10, having multiple axially extending teeth. Spindle nut 6 further includes an axial stop 11 at one end, which has a conically-shaped longitudinal section.

Transmission 3 further includes a drive internal gear 12, which includes an inner toothing 13 engaging with outer toothing 10. Because outer toothing 10 and inner toothing 13 are axially oriented, spindle nut 6 is axially shiftable relative to drive internal gear 12. Drive internal gear 12 further includes an outer toothing, with which drive internal gear 12 is operatively connected to an intermediate gear wheel 15, which has one gear ratio and which meshes with a drive pinion 14 of electric motor 2.

If electric motor 2 is activated, a torque is applied to drive internal gear 12, which entrains spindle nut 6 via inner thread 13 and sets spindle nut 6 in rotational motion. Because spindle rod 4, respectively, the pressure piston is rotatably fixedly mounted, an axial movement of the pressure piston is generated by the rotation of spindle nut 6 and the brake master cylinder is actuated. In this way, an automatic braking operation may be initiated or the driver may be assisted by the generation of an additional braking force. If the driver actuates the brake pedal faster than electric motor 2 is able to respond, or if electric motor 2, respectively, brake booster 1 exhibits a defect, then it is possible for the driver to actuate purely mechanically the pressure piston due to the axial displacement of spindle nut 6 with respect to drive internal gear 12. In doing so, the driver forces spindle rod 4, together with spindle nut 6, axially through drive internal gear 12. Spindle nut 6 with axial stop 11 is pressed back against drive internal gear 12 via a spring element 16, in particular, a coil spring, so that axial stop 11 abuts drive internal gear 12 and no further shift is possible.

In this respect, transmission 3 is pre-tensioned by the spring element in the direction of an initial state.

Figure 2:
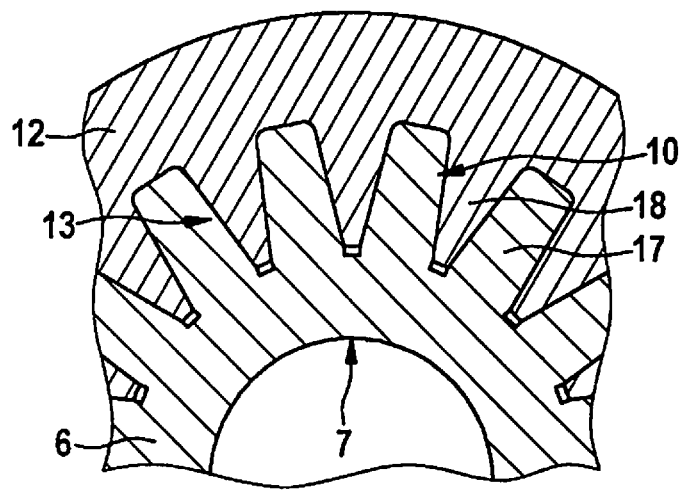
FIG. 2 shows a cross sectional representation through a transmission of the brake booster.

FIG. 2 shows a cross section through drive internal gear 12. Here it is apparent that teeth 17 of outer thread 10 and teeth 18 of inner thread 13 meshing therewith each have angled tooth flanks, so that teeth 17, 18 each exhibit a trapezoidal cross section. As a result, meshing teeth 17 and 18 act to center spindle nut 6 and drive internal gear 12. The choice of the contour of teeth 17, 18 ensures that drive internal gear 12 and spindle nut 6 are automatically centered relative to one another. In particular, when drive internal gear 12 is driven by drive motor 2 in order to transfer a torque, a radial centering of drive internal gear 12 relative to spindle nut 6 is carried out due to the angled tooth flanks, as a result of which drive internal gear 12 and spindle nut 6 are automatically optimally oriented relative to one another.

Figure 3:
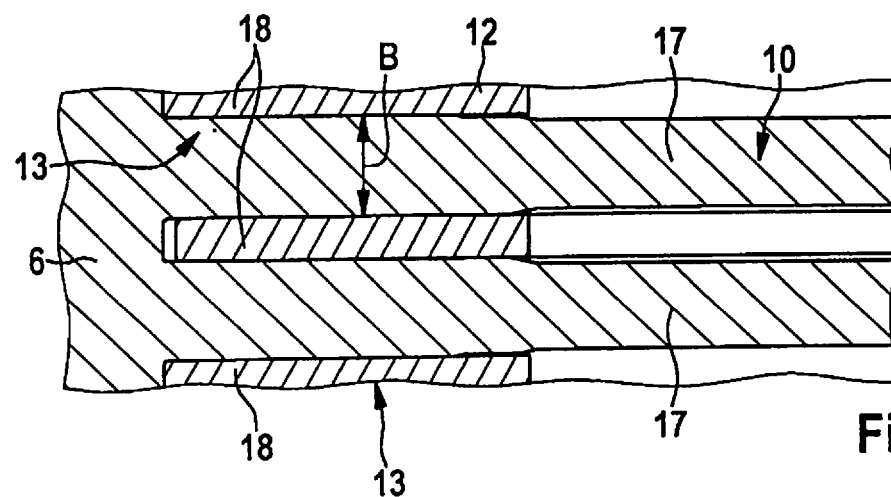
FIG. 3 shows a simplified longitudinal sectional representation of the transmission.

FIG. 3 shows a simplified longitudinal sectional representation of transmission 3 in the area of drive internal gear 12. It is apparent here, in particular, that teeth 18 of drive internal gear 12 do not extend axially as far as teeth 17 of drive internal gear 12, so that spindle nut 6 is displaceable with respect to drive internal gear 12 corresponding to the longitudinal extension of teeth 17, without the rotational entrainment of the toothing being lost. The tooth width of teeth 17 and 18 is advantageously selected as a function of their material strength. In doing so, the material properties of spindle nut 6 and drive internal gear 12 are proportioned relative to one another and the tooth widths are selected in accordance with this proportion. In the exemplary embodiment depicted herein, spindle nut 6 is manufactured from a material less solid as compared to drive internal gear 12, and thus has a comparatively larger tooth width B. The geometry of the toothing, i.e., of inner toothing 13 and outer toothing 10 in this case is selected in such a way that a sufficient overlap of teeth 17 and 18 for rotational entrainment is ensured under all expected environmental conditions such as, in particular, temperature or humidity.

Figure 4A:
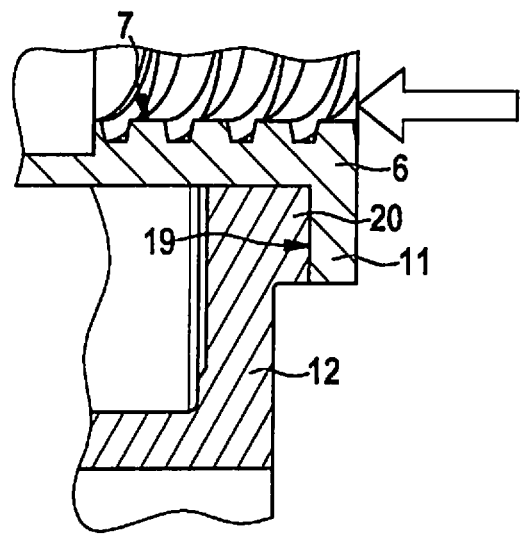
FIGS. 4A and 4B show design variants of an axial stop of a spindle nut of the transmission.
Figure 4B:
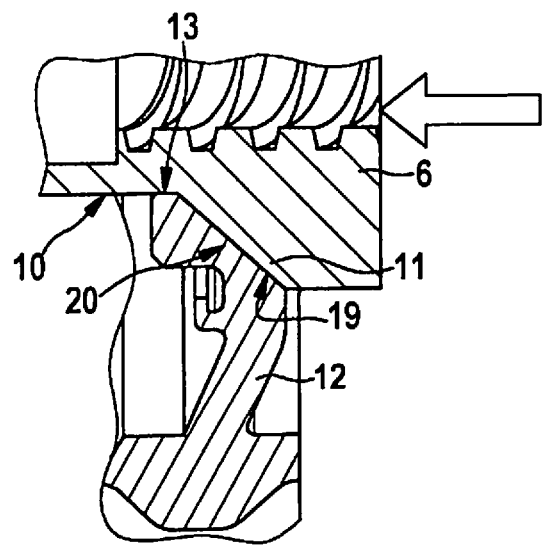

FIGS. 4A and 4B show, each in a longitudinal sectional representation of transmission 1, different specific embodiments of axial stop 11 of spindle nut 6.

FIG. 4A also shows axial stop 11 according to a first exemplary embodiment, in which axial stop 11 extends radially outwardly perpendicular to the displacement direction of spindle nut 6, respectively, perpendicular to the axial extension of spindle nut 6, so that it forms a flat, respectively, perpendicular stop surface 19. Drive internal gear 12 is designed complementarily to axial stop 11, so that it also includes a stop 20, which forms a stop surface complementary to stop surface 19. In the exemplary embodiment of FIG. 4A, the result is that high axial forces may be trans- ferred by spindle nut 6 onto drive internal gear 12 and may be supported thereon. One arrow in FIGS. 4A and 4B indicates by way of example the axial load of spindle nut 6. Thus, spindle nut 6 with axial stop 11 is pressed, in particular, by spring element 16, against stop 20 of drive internal gear 12. Thus, an initial position of spindle nut 6 in relation to drive internal gear 12 is defined and automatically reached as a result of axial stop 11 if, for example, a user terminates the actuation of a brake pedal. Spindle nut 6 is automatically pushed back into the initial position by spring element 16.

FIG. 4B shows another exemplary embodiment, as it is also shown in FIG. 1, in which axial stop 11 is conically designed and which thus extends at an angle, extending over the entire circumference, relative to the axial extension of spindle sleeve 6. This results in a conical stop surface 19, which interacts with a correspondingly conically-shaped stop surface of stop 20 of drive internal gear 12. As a result of angled stop surface 19, the axial load is supported both axially as well as radially. An advantageous centering of spindle nut 6 relative to drive internal gear 12 results in this case, in particular, as a result of the radial support. The distribution of force in this case relieves not only the interface, but at the same time also reduces the radial deformation of spindle nut 6, which is generated by the force distribution from the trapezoidal threads, respectively from the engagement with spindle rod 4.

If, therefore, spindle nut 6 is driven by drive motor 2 with the aid of transmission 3, in order to displace spindle rod 4 for actuating the pressure piston, spindle nut 6 in this case is advantageously supported by axial stop 11 against stop 20 of drive internal gear 12.

Figure 5:
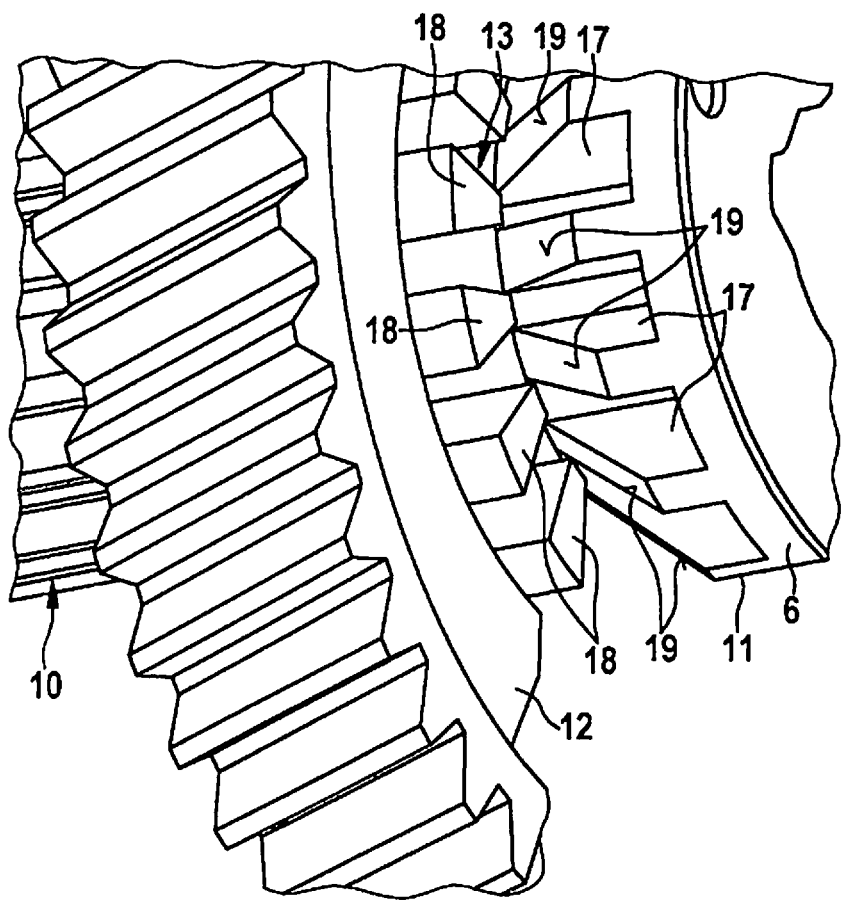
FIG. 5 shows a perspective partial representation of the transmission.

FIG. 5 shows a perspective partial representation of transmission 1 in the area of drive internal gear 12 according to another exemplary embodiment. According to this exemplary embodiment, it is provided that outer toothing 10 of spindle nut 6 extends into axial stop 11. Axial stop 11 in this case is designed according to the exemplary embodiment of FIG. 4B having a conical stop surface 19. Because outer toothing 10 extends into axial stop 11, stop surface 19 is uniformly interrupted over the circumference, so that the axial stop is formed by multiple stop surfaces 19 oriented at an angle to the axial extension of spindle sleeve 6. Thus, teeth 18 of inner toothing 13 of drive internal gear 12 overlap in sections in axial stop 11, when spindle nut 6 is moved to as far as drive internal gear 12, so that stop surfaces 19 meet correspondingly designed stop counter surfaces of stop 20 of drive internal gear 12.

As a result of this overlapping specific embodiment, the toothing between spindle nut 6 and drive internal gear 12 exhibits a greatest possible overlap in normal operation, when spindle nut 6 with axial stop 11 abuts drive internal gear 12, so that high torques may be reliably transferred.

What is claimed is:

1. A brake booster for a brake master cylinder of a motor vehicle, comprising:
   a drive motor; and
   a transmission, the drive motor connected via the transmission to a pressure piston for the brake master cylinder, the transmission including a rotatable spindle nut having an inner thread and a rotatably fixed axially displaceable spindle rod having an outer thread, the threads engaging one another in order to convert a rotational movement of the drive motor into a translational movement of the spindle rod, and the spindle nut including an outer toothing, which is engaged with a toothing of a drive wheel of the transmission;

wherein the spindle nut is displaceable axially relative to the drive wheel and is co-axial with the drive wheel.

2. The brake booster as recited in claim 1, wherein the outer toothing of the spindle nut extends further over a sleeve-like section of the spindle nut than the toothing of the drive wheel, so that outer toothing of the spindle nut and the toothing of the drive wheel are engaged for rotational entrainment, regardless of an axial displacement of the spindle nut.

3. The brake booster as recited in claim 1, wherein the outer toothing of the spindle nut is designed as axial toothing.

4. A brake booster for a brake master cylinder of a motor vehicle, comprising:
   a drive motor; and
   a transmission, the drive motor connected via the transmission to a pressure piston for the brake master cylinder, the transmission including a rotatable spindle nut having an inner thread and a rotatably fixed axially displaceable spindle rod having an outer thread, the threads engaging one another in order to convert a rotational movement of the drive motor into a translational movement of the spindle rod, and the spindle nut including an outer toothing, which is engaged with a toothing of a drive wheel of the transmission;
   wherein the spindle nut is displaceable axially relative to the drive wheel, and
   wherein the drive wheel is designed as a drive internal gear and the toothing of the drive wheel is designed as an inner toothing of the drive internal gear.

5. The brake booster as recited in claim 4, wherein the spindle nut includes an axial stop for the drive internal gear.

6. The brake booster as recited in claim 5, wherein the axial stop is oriented at least in sections perpendicularly to an axial extension of the spindle nut.

7. The brake booster as recited in claim 5, wherein the axial stop is oriented at least in sections at an angle relative to the axial extension of the spindle nut.

8. The brake booster as recited in claim 5, wherein the axial stop is conical.

9. The brake booster as recited in claim 5, wherein the drive internal gear includes a stop designed complementarily to the axial stop.

10. The brake booster as recited in claim 5, wherein the outer toothing of the spindle nut extends into the axial stop.

11. The brake booster as recited in claim 5, wherein the spindle nut is assigned at least one spring element, which presses the spindle nut with the axial stop against the drive internal gear.

* * * * *